US008502666B1

United States Patent
Tam et al.

(10) Patent No.: US 8,502,666 B1
(45) Date of Patent: Aug. 6, 2013

(54) REMOTE HUMAN PRESENCE DETECTION SYSTEM

(75) Inventors: Daniel Tam, San Diego, CA (US); Aldo Monges, San Diego, CA (US); Marcus Maurer, San Diego, CA (US); Chris Dilay, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 275 days.

(21) Appl. No.: 13/047,975

(22) Filed: Mar. 15, 2011

Related U.S. Application Data

(63) Continuation-in-part of application No. 12/408,768, filed on Mar. 23, 2009, now Pat. No. 8,188,862.

(51) Int. Cl.
*G08B 13/26* (2006.01)

(52) U.S. Cl.
USPC ............. 340/561; 340/573.1; 340/544

(58) Field of Classification Search
USPC .............. 340/561, 556, 541, 544, 551, 573.1, 340/571, 572.1–572.9
See application file for complete search history.

(56) References Cited

U.S. PATENT DOCUMENTS

| | | | | | |
|---|---|---|---|---|---|
| 4,433,328 | A | * | 2/1984 | Saphir et al. | 340/555 |
| 5,369,269 | A | * | 11/1994 | Fukuda et al. | 250/221 |
| 5,507,291 | A | * | 4/1996 | Stirbl et al. | 600/407 |
| 5,668,342 | A | * | 9/1997 | Discher | 86/50 |
| 7,119,682 | B1 | * | 10/2006 | Fisher | 340/550 |
| 7,636,048 | B2 | | 12/2009 | Krasula et al. | |
| 7,884,727 | B2 | * | 2/2011 | Tran | 340/573.1 |
| 2004/0220753 | A1 | * | 11/2004 | Tabe | 702/32 |

* cited by examiner

*Primary Examiner* — Daniel Previl
(74) *Attorney, Agent, or Firm* — Arthur K. Samora; Kyle Eppele

(57) ABSTRACT

Methods for remote detection of humans can include the step of transmitting vertically polarized electromagnetic signals into an area of interest (AOI) when no humans are present. A first time domain measurement of return response signal energy from the AOI can be accomplished to establish a background signal. A second time domain measurement of response signal energy from the AOI can be made when at least one human is present, to establish a background-plus-human signal. The two signals can be subtracted to yield a reference time domain human signal. The electromagnetic signal is periodically re-transmitted. The background subtracted from subsequent response energy, and the result compared to the reference time domain human signal. A visual or audible indication occurs when the resulting signal matches the reference signal. Fast Fourier Transforms (FFT) of the time domain signals can be used to yield frequency responses, which can be monitored.

7 Claims, 9 Drawing Sheets

REMOTE HUMAN PRESENCE DETECTION SYSTEM

This application is a continuation-in-part of U.S. application Ser. No. 12/408,768, filed Mar. 23, 2009 now U.S. Pat. No. 8,188,862 (NC 099292), and entitled "Remote Detection of Covertly Carried Metal Objects". The '768 application is hereby incorporated by reference herein in its entirety.

FEDERALLY-SPONSORED RESEARCH AND DEVELOPMENT

This invention (Navy Case No. 100573) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif. 92152; voice (619) 553-5118; e-mail ssc pac t2@navy.mil.

FIELD OF THE INVENTION

The present invention applies generally to human presence detection systems. More specifically, some embodiments of the invention pertain to systems and methods for the remote detection of humans within an area of interest using the resonant frequencies inherent in the human body.

BACKGROUND OF THE INVENTION

Given the political climates of various locations around the world, soldiers, marines, law enforcement and other personnel from various security agencies are constantly faced with situations where they are confronted with suspect individuals. In certain situations it may be desirable to set a perimeter around a location for security personnel to identify if a human is within a certain distance of a defined area. Unfortunately, in order to determine whether such suspect individuals are present using conventional search techniques, it has been necessary to use personnel to stand watch. Such personnel may come into close proximity of terrorists and criminals, which can be extremely undesirable and pose a great risk to these personnel, as well as to innocent civilians who happen to be nearby when the suspect individuals are searched for weapons. Accordingly, new technology related to covert detection of humans from a distance is desirable.

In view of the above, one object of the present invention is to provide systems and methods for remote detection of humans that are able to detect the presence of human being at a distance. Another object of the present invention is to provide systems and methods for remote detection of humans that use resonant frequencies inherent in the human body. Another object of the present invention is to provide systems and methods for remote detection of humans that minimize the false alarm rates by using detection frequencies that are unique to humans and by employing a time domain approach to process those frequencies. Still another object of the present invention is to provide systems and methods for remote detection of humans that use unique resonant response of the human body to detect a human subject in a noise-laden area with many other moving objects other than humans. These and other advantages of the invention, as well as additional inventive features, will be apparent from the description of the invention provided herein.

SUMMARY OF THE INVENTION

Methods and systems for remote detection of humans according to several embodiments can include the step of transmitting an electromagnetic signal into an area of interest (AOI) that is to be monitored when it is known that no humans are present. The electromagnetic signal can be vertically polarized and can reflect off of the AOI surroundings and return to the system as response signal energy. A first time domain measurement of response signal energy from the AOI can be accomplished to establish a background signal.

The methods according to several embodiments can further include conducting a second time domain measurement of response signal energy from the AOI when it is known that at least one human is present. This can establish a background-plus-human signal. Next, the methods can subtract the results of the background-plus-human signal from the background signal to establish a reference time domain human signal. Once the reference time domain signal is generated and stored, the methods and systems according to several embodiments can periodically retransmit the electromagnetic signal, subtract the background signal from any response signal energy, and compare the result to the stored reference human signal. The methods and systems can further alert the user via a visual or audible indication when the comparison indicates that a human is in the AOI.

For several embodiments, the methods can include the steps of conducting a Fast Fourier Transform (FFT) on the time domain reference signal after it has been stored to yield a reference human frequency response for the AOI. For these embodiments, FFT's on a time domain measurement of the response energy of subsequent return signal energies can be accomplished (after the background signal has been subtracted out as described above). These embodiments can provide the previously mentioned indications when subsequent frequency responses match the reference human frequency response.

An exemplary system for accomplishing the methods according to several embodiments can include a directional antenna, a signal generator that can be coupled to the antenna and that can be operable to cause the antenna to emit a first electromagnetic signal towards the AOI, and a data capture device that can be operable to capture response signal energy received by the directional antenna. The data capture device can include a processor that can include a non-transitory computer readable medium containing computer instructions stored therein for processing the response signal energy as described above.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The ungrounded human body acts like a lossy antenna that resonates approximately at a frequency of 75 Megahertz (MHz). This resonance phenomenon can be used to detect whether or not a human is present in an area of interest (AOI). Additionally, when a human body is carrying metallic objects (or when animals or the like are trained to carry metal objects), the natural resonance of the human body will interact with the natural resonant response of the metallic objects to cause the human body to resonate at a modified frequency range due to the "mutual impedance coupling phenomena", i.e., the same effect that occurs when a person standing close to a television antenna causes a change in picture quality of the television.

It can be shown that remote detection of humans in an AOI can be accomplished using the resonant phenomena described above. It can also be shown that weapons detection at a distance may be accomplished by taking advantage of the mutual impedance coupling phenomena at this resonant frequency. In this manner, low power radio-frequency (RF) transmissions (which will not harm people) at a resonant frequency could be used to detect metal objects on people. The mutual impedance phenomena could be used to "boost" the return signal energy, which will further allow for remote detection of metal objects at a distance as described below. The remote detection allows the user to take action as desired to obviate the threat presented by the metal-carrying person.

Figure 1:
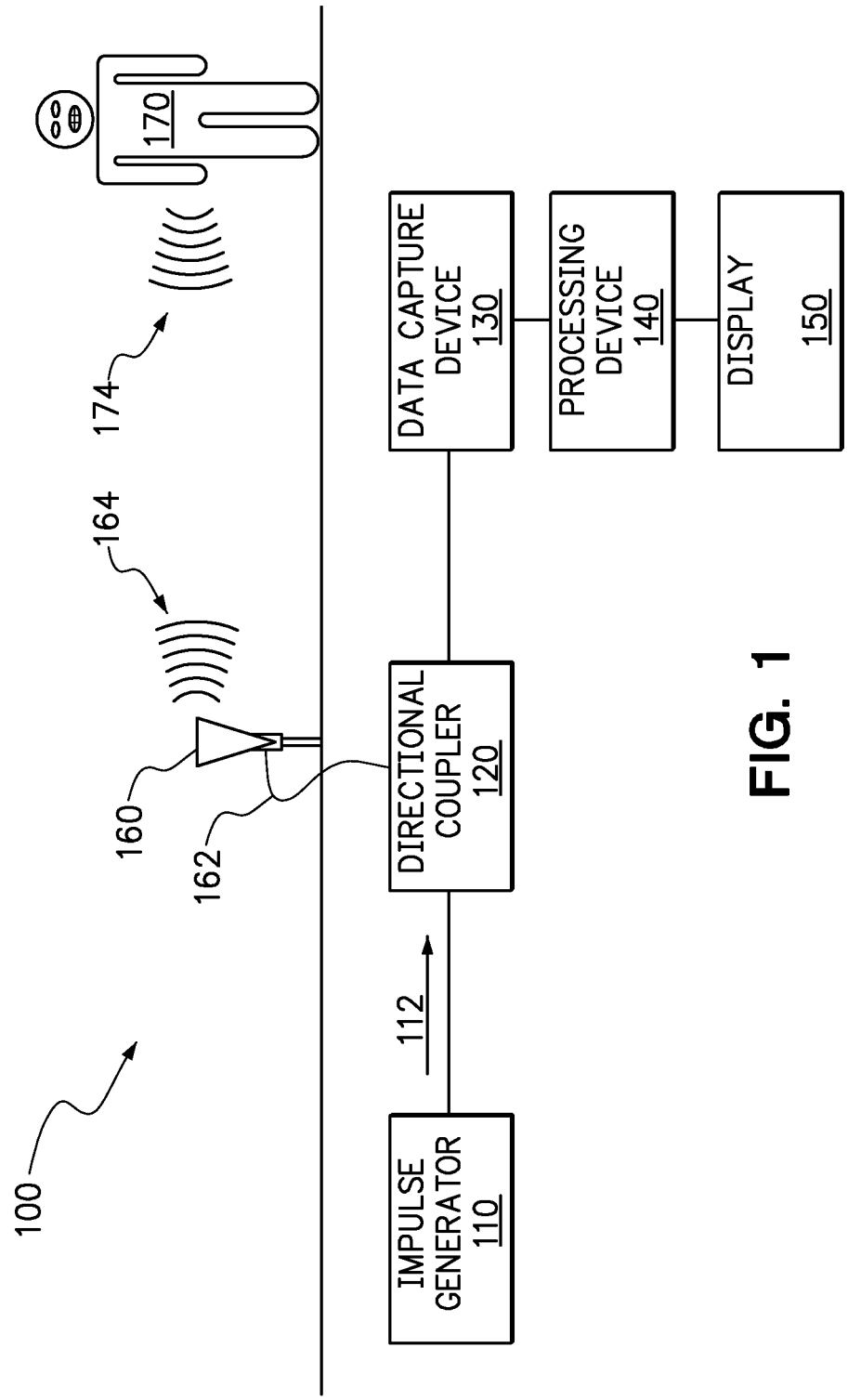
FIG. 1 is an exemplary detection system according to several embodiments of the present invention.

FIG. 1 depicts an exemplary metal detection system 100 usable to determine whether a person 170 (or other organism, such as a trained person, for instance) is present in an AOI or if the person 170 is carrying an appreciable amount of metal, e.g., a handgun, components of a bomb, and so on. As shown in FIG. 1, the exemplary detection system 100 includes an antenna 160 coupled to both an impulse generator 110 and data capture device 130 via a directional coupler 120 and cable 162. Antenna 160 can be a directional antenna, which can result in increased range for the systems and methods according to several embodiments without having to increase the power of the electromagnetic signal. System 100 can also include a processing device 140. A display 150 can be interconnected to data capture device 130 via processor 140. Processor 140 can include non-transitory medium for storing instructions that, when carried out by processor 140, can perform methods of the present invention according to several embodiments as described more fully below.

In general operation, the impulse generator 110 can emit an impulse signal 112, which can be fed to the antenna 160 via coupler 120 and cable 162. In turn, the antenna can emit a first electromagnetic detection signal 164 towards an AOI to detect person 170 (if person 170 is present). The operation is system 100 in several different modes and embodiments is discussed in more detail below.

Note that by placing the person 170 in front of the antenna 160 and hitting person 170 with the first detection signal 164, a scattering response signal 174 of response energy may be generated and provided back to the antenna 160.

Note that the ungrounded human body (with and without wearable metallic objects) can act as a parasitic antenna, and re-radiated energy with its natural or modified resonant response (due to worn metal). As the human body tends to resonate at about 75 MHz, it can be advantageous to set impulse generator 110 to produce impulses having large amounts of spectral energy in the VHF (30 MHz-300 MHz) spectra. Similarly, it may be beneficial for antenna 160 to be generally optimized for use in the VHF spectra, as well as have appreciable directional capabilities so as to minimize off-target emission and reception so as to increase signal-to-noise ratio (SNR) and/or the signal-to-interference-plus-noise ratio (SINR) of response signal energy 174.

Returning to FIG. 1, the scattered response signal 174 from person 170 can be captured by antenna 160, and routed to the data capture device 130 via cable 162 and directional coupler 120.

In turn, the captured response signal 174 may be subjected to a variety of processing techniques, such as a Fast Fourier Transform (FFT) signal analysis, to produce a frequency domain "picture" for later resonant frequency identification using any number of known or later developed techniques. One such non-limiting technique is discussed below.

Additionally, time waveform measurements may be conducted with a human body that is known to be carrying metal objects in the AOI, and when subtracted from the aforementioned human body response template, results in a threat template. Either time domain or frequency domain responses could be stored, as mentioned above. It should be appreciated that because the relative position of worn metallic objects on person 170 relative to antenna 160 may mask the presence of such metallic objects, different templates that are based on different positioning of metal objects relative to the body may be employed. Alternatively (or additionally), multiple independent detection systems positioned at different angles to target human bodies may be employed.

In actual practice, an exemplary detection system similar to system 100 was tested by the inventors of the present disclosure to observe ungrounded human body resonant frequencies for a test subject (with and without metal) at distances of 50 feet, 70 feet, 100 feet and 120 feet between an antenna and a human subject. Accordingly, background templates, safe templates and suspect templates were created using captured information.

Figure 2:
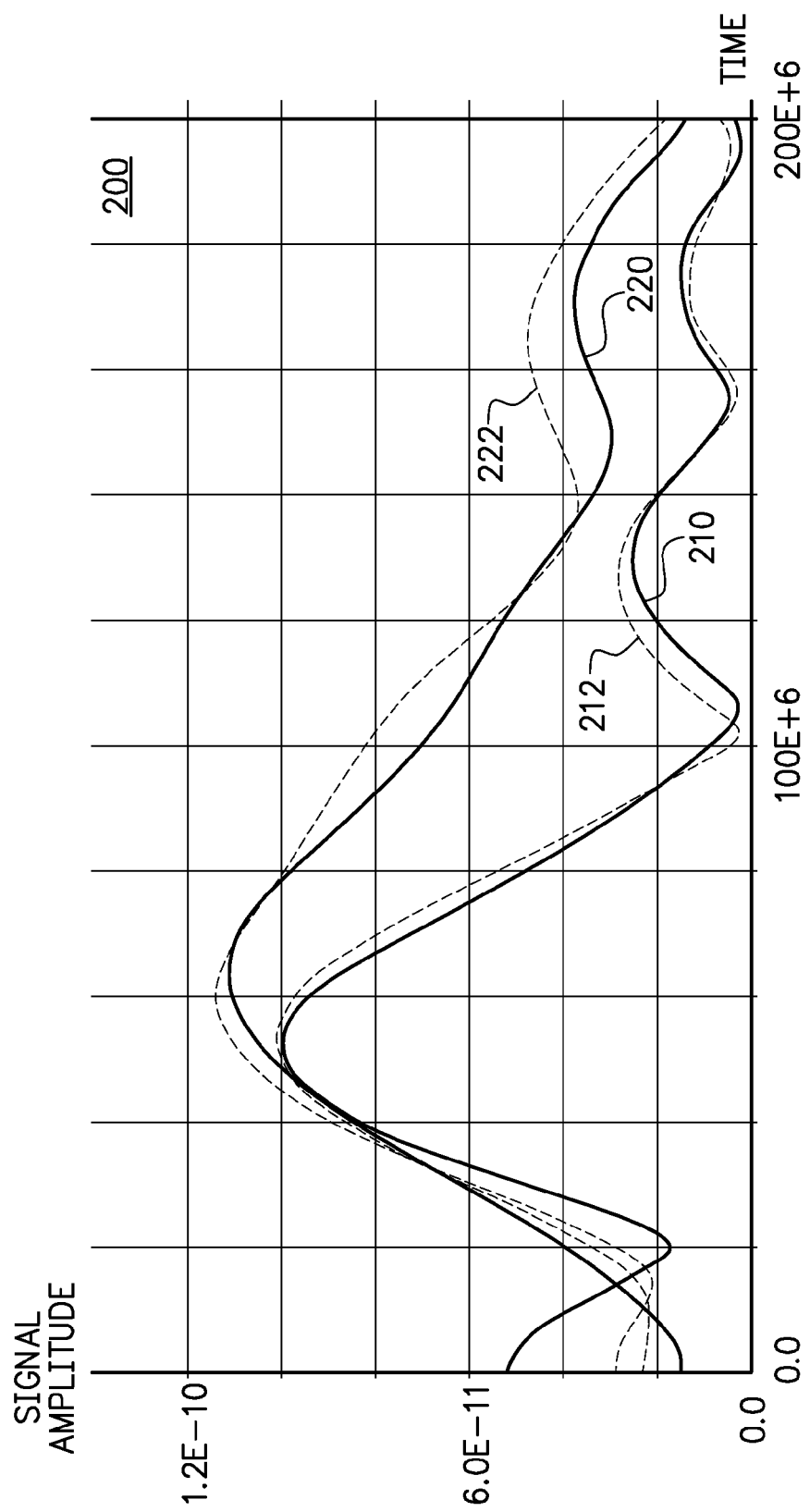
FIG. 2 is a graph that depicts a variety of response signal information for a human subject without metal in comparison with the same human subject carrying metal for ranges of fifty feet and seventy feet.

FIG. 2 is a frequency-domain graph 200 containing the above-mentioned templates for a human test subject for fifty feet without metal 210, fifty feet with metal 212, seventy feet without metal 220, and seventy feet with metal 222. As can be seen by FIG. 2, that absence or presence of metal on a human body can produce distinctive and appreciable changes in the frequency response of a template. Such templates may thus be used as a cornerstone of a remote body-worn metal detection system.

Note that, given that response signal 174 may vary depending on relative distance between the antenna 160 and person 170, it may be useful to derive range information using the relative timing between the detection signal 164 and the response signal 174, or by supplementary equipment, such as laser-based or sonic-based range finders, which could also yield information as to whether the person is approaching the antenna or not. Such range information can be used to determine the appropriate template(s) with which to compare a particular response signal noting that, in various embodiments, it may be useful to form amalgam templates, e.g., interpolated templates derived from two or more sampled templates, to provide comparison data to a given response signal. Other information, such as SNR and SINR, as well as various other secondary considerations, such as weather conditions, e.g., rain, may also be used by processing device 140 to determine whether person 170 is carrying metal.

Upon the appropriate processing by processing device 140, some form of likelihood indicator may be provided to display 150 so as to inform an operator as to the likelihood of metal being worn by person 170.

Figure 3:
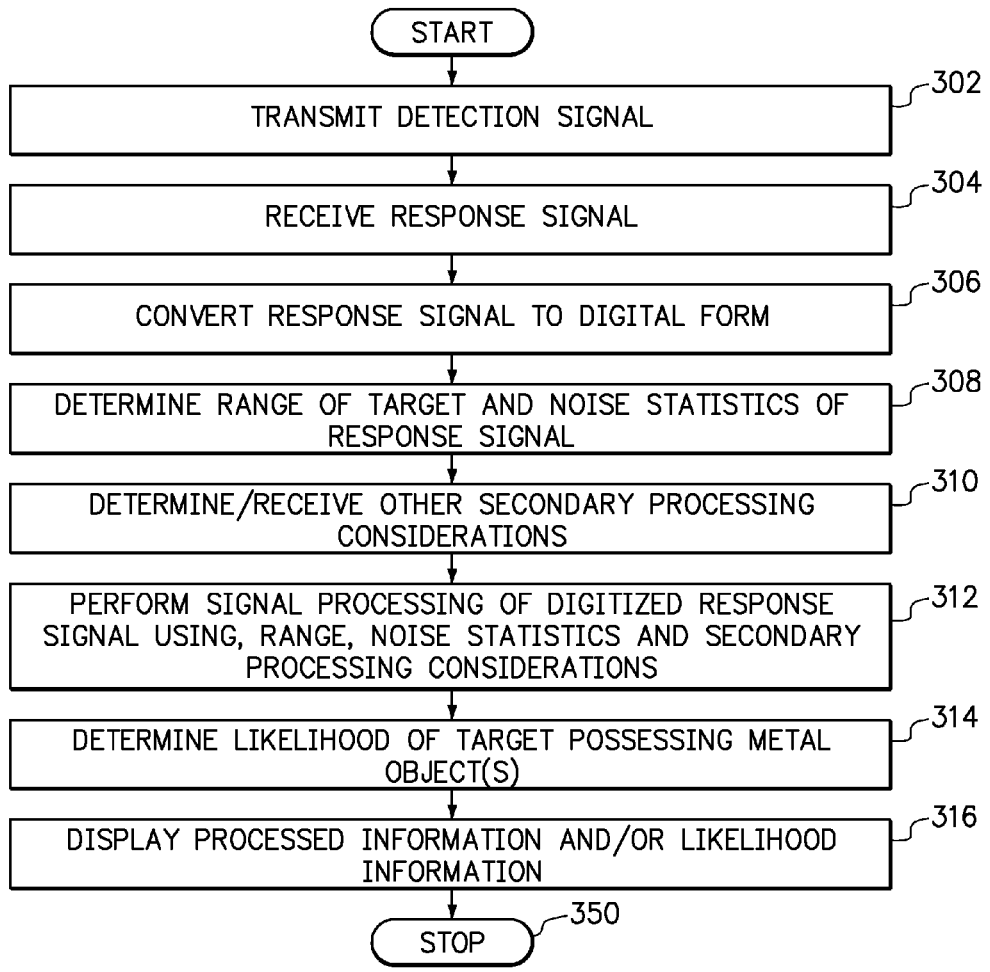
FIG. 3 is a flowchart outlining an exemplary process for practicing the invention shown in FIG. 1, according to several embodiments of the present invention.

FIG. 3 is a flowchart outlining an exemplary process for remote worn metal detection of a human body (or other person). The process starts in step 302 where a detection signal, presumably derived from some form of impulse generator or other equipment, is transmitted from an antenna to a target human body. Again, as mentioned above, it may be beneficial to fashion the detection signal and antenna to work efficiently within the VHF frequency range, as well as fashion the antenna to have an appreciable degree of directionality. Control continues to step 304.

In step 304, a response signal generated/provided by the target human body (in response to interaction with the detection signal), may be received by the antenna (or optionally a second antenna), and, in step 306, the received response signal may be converted to digital form. Next, in step 308, target range and noise statistics may be determined. Then, in step 310, various secondary processing considerations, e.g., weather conditions, may be determined and/or received. Control continues to step 312.

In step 312, the digitized response signals may be processed using and range information, noise statistics and secondary processing considerations. As discussed above, such processing may be used in the context of template matching, as well as any number of other recognizable approaches to those skilled in the art. Next, in step 314, the likelihood that the target human body has some form of closely coupled metal is determined. Then, in step 316, such likelihood information, as well as any other relevant processing information, may be displayed to an operator for appropriate action. Control then continues to step 350 where the process stops.

Figure 4:
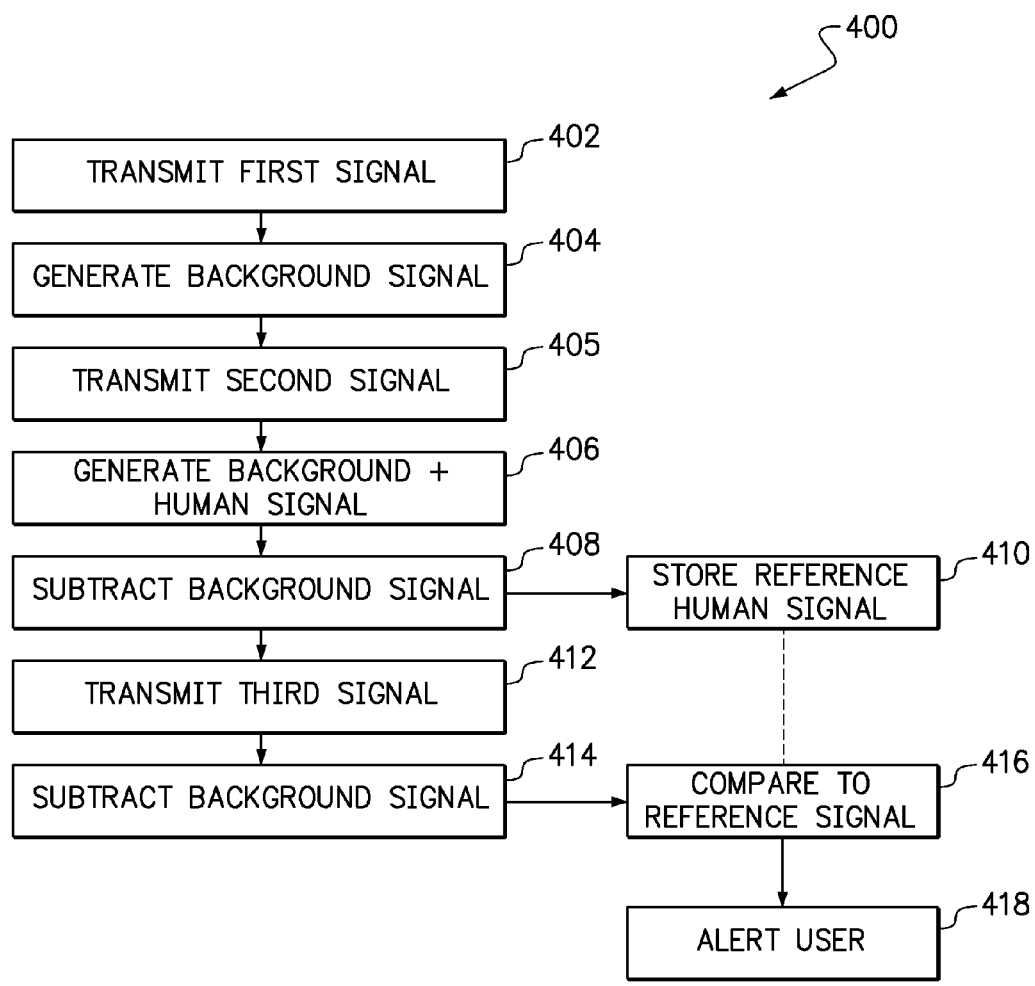
FIG. 4 is a flowchart of steps that can be taken to accomplish the methods according to several alternative embodiments of the present invention.

Referring now to FIG. 4, the steps for the methods of detecting a human within an AOI according to several embodiments can be shown and can be generally represented by reference character 400. As shown, method 400 can include the step 402 of transmitting an electromagnetic signal. The electromagnetic signal can be transmitted by the directional antenna 160, and can be vertically polarized and in the VHF/UHF range as discussed above.

Figure 5:
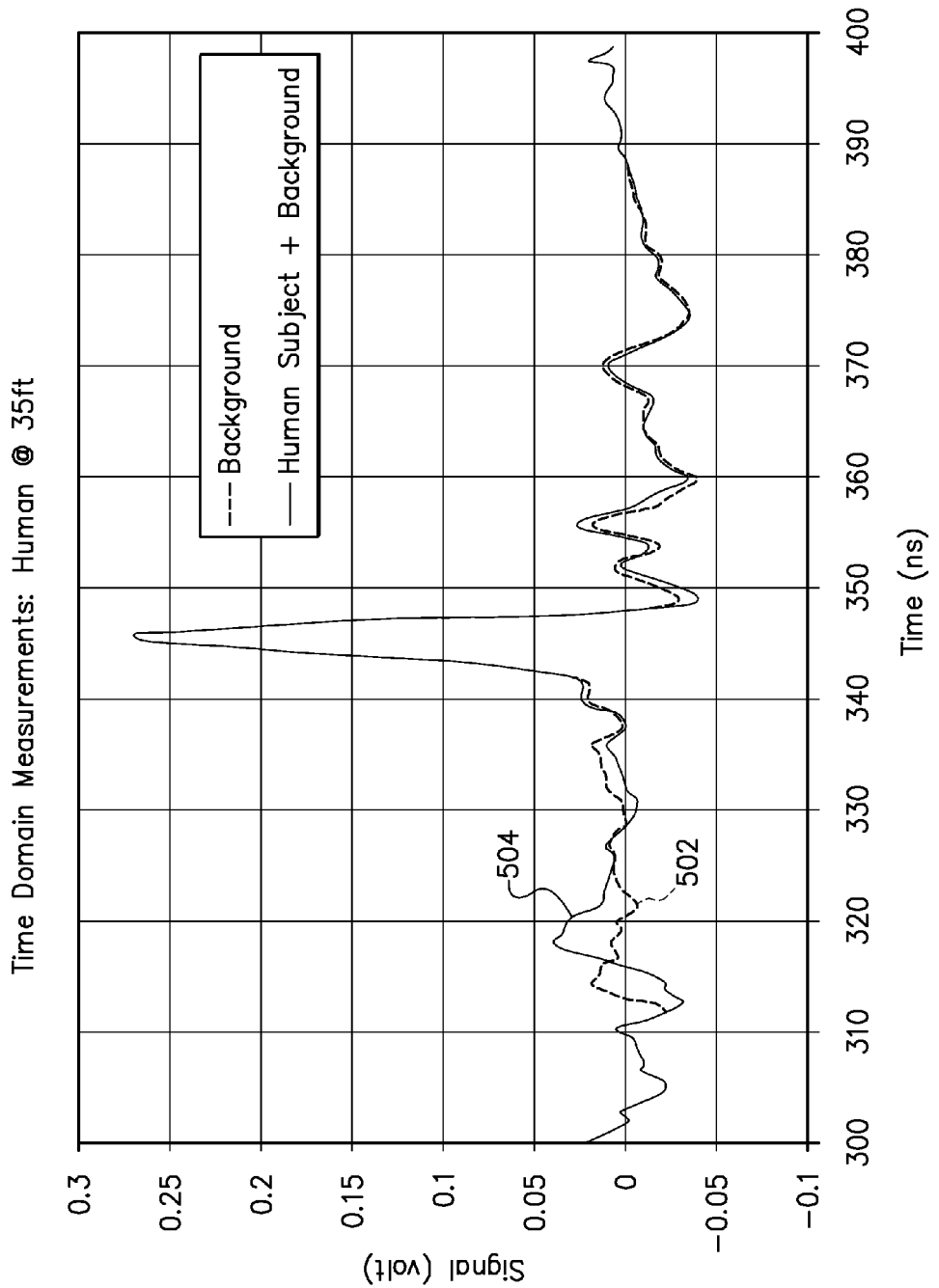
FIG. 5 is a graph that depicts time domain response signal information for the area of interest (AOI), which can be generated when practicing some of the embodiments depicted in FIG. 4.

As shown in FIG. 4, the methods according to several embodiments can further include the step 404 of generating a background time domain response signal. To do this, the aforementioned electromagnetic signal can be transmitted into the AOI by the generator 110, in cooperation with the directional coupler 120, cable 162 and antenna 160 described above, when it is known that no humans 170 are present. When this is the case, the return response energy from the AOI is captured by data capture device 130, and processed by processor 140 and displayed (by display in several embodiments) to establish a background time domain response signal. One exemplary time domain response sign is indicated by graph 502 in FIG. 5.

Next, and as represented by boxes 405 in FIG. 4, a second electromagnetic signal can be transmitted to the AOI when it is known that a human 170 is in the AOI as described above. The response energy for this instance can be captured and processed as described above to establish a background-plus-human time domain response, as depicted by box 406. A graph of the background-plus-human time domain response is illustrated by graph 504 in FIG. 2.

Figure 6:
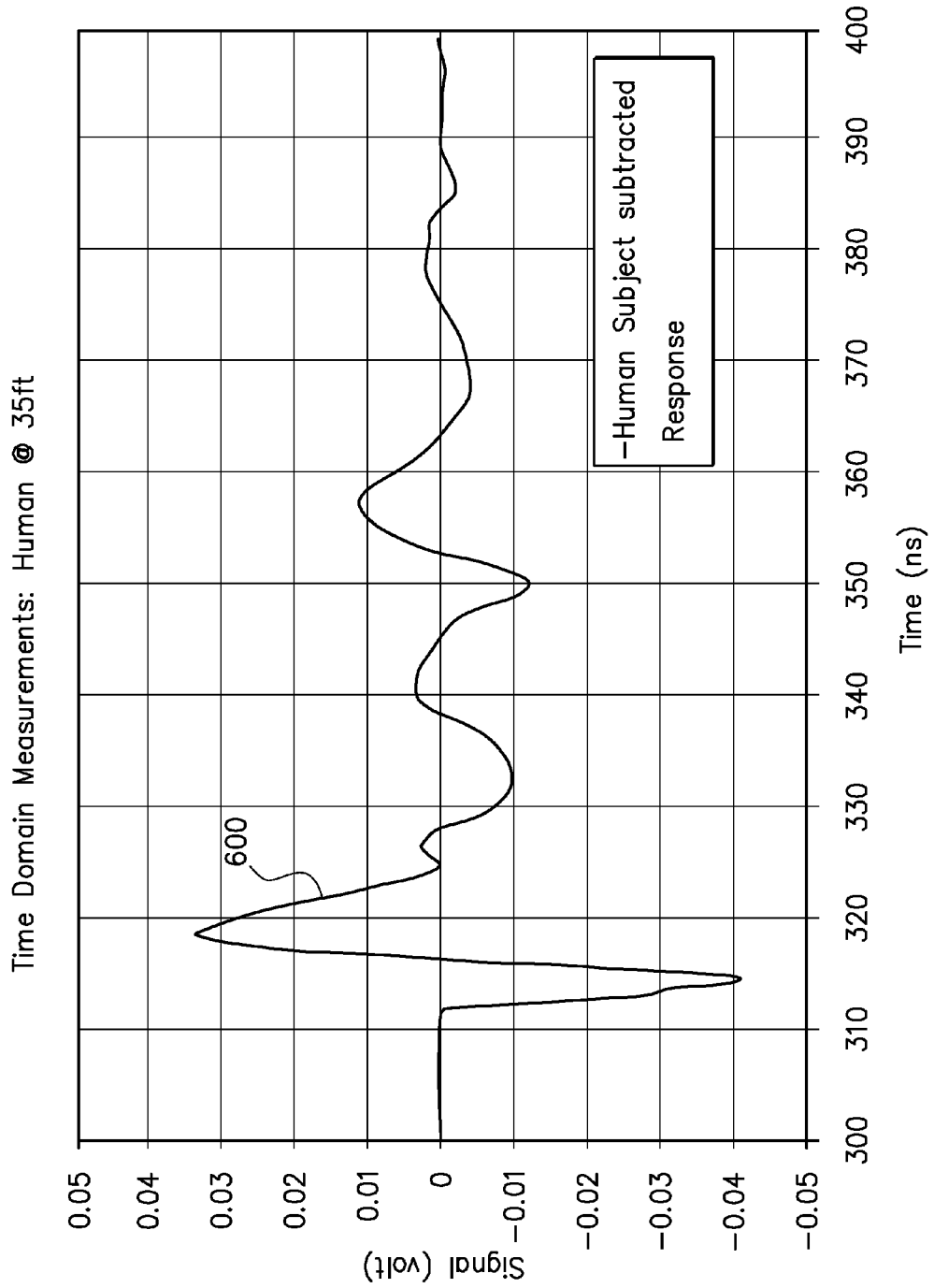
FIG. 6 is the same graph as FIG. 5 but with the background time domain response information having been removed by processing techniques according to several embodiments to yield an human time domain response at thirty-five feet (35 ft); and, FIGS. 7-9 are human time domain responses for an AOI according to several embodiments of the present invention for 55 ft, 75 ft, and 100 ft, respectively.

As depicted by box 408 in FIG. 4, the methods according to several embodiments can also further include the step of subtracting the background-plus-human time domain response from the background response. This results in a reference human time domain response. A graph of the reference time domain response is shown by line 600 in FIG. 6. The reference time domain response can be stored for further use by the methods, as indicated by box 410 in FIG. 4.

Once the human reference signal is generated, third and subsequent electromagnetic signals can be selectively transmitted, as indicated by box 412 in FIG. 4. The known background time domain response (background signal) from step 404 can be subtracted from the response signal energy 174 resulting from step 412, as shown by box 414. Next, the results of the subtraction step of box 414 can be compared to the stored reference human signal of box 410. Based on the comparison results of box 416, the system 100 can alert the user if a human 170 is present, as indicated by step 418 in FIG. 4.

Figure 7:
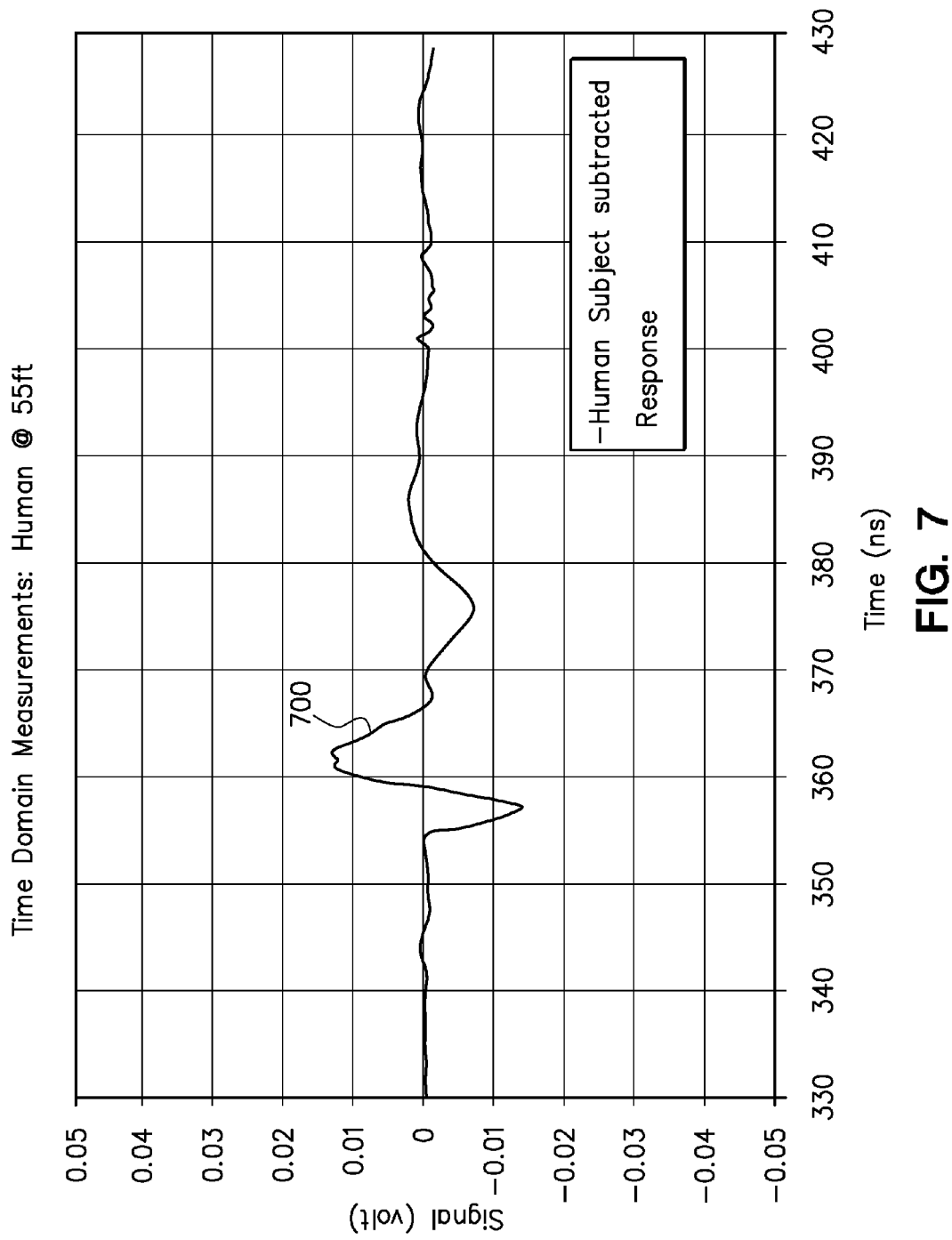
Figure 8:
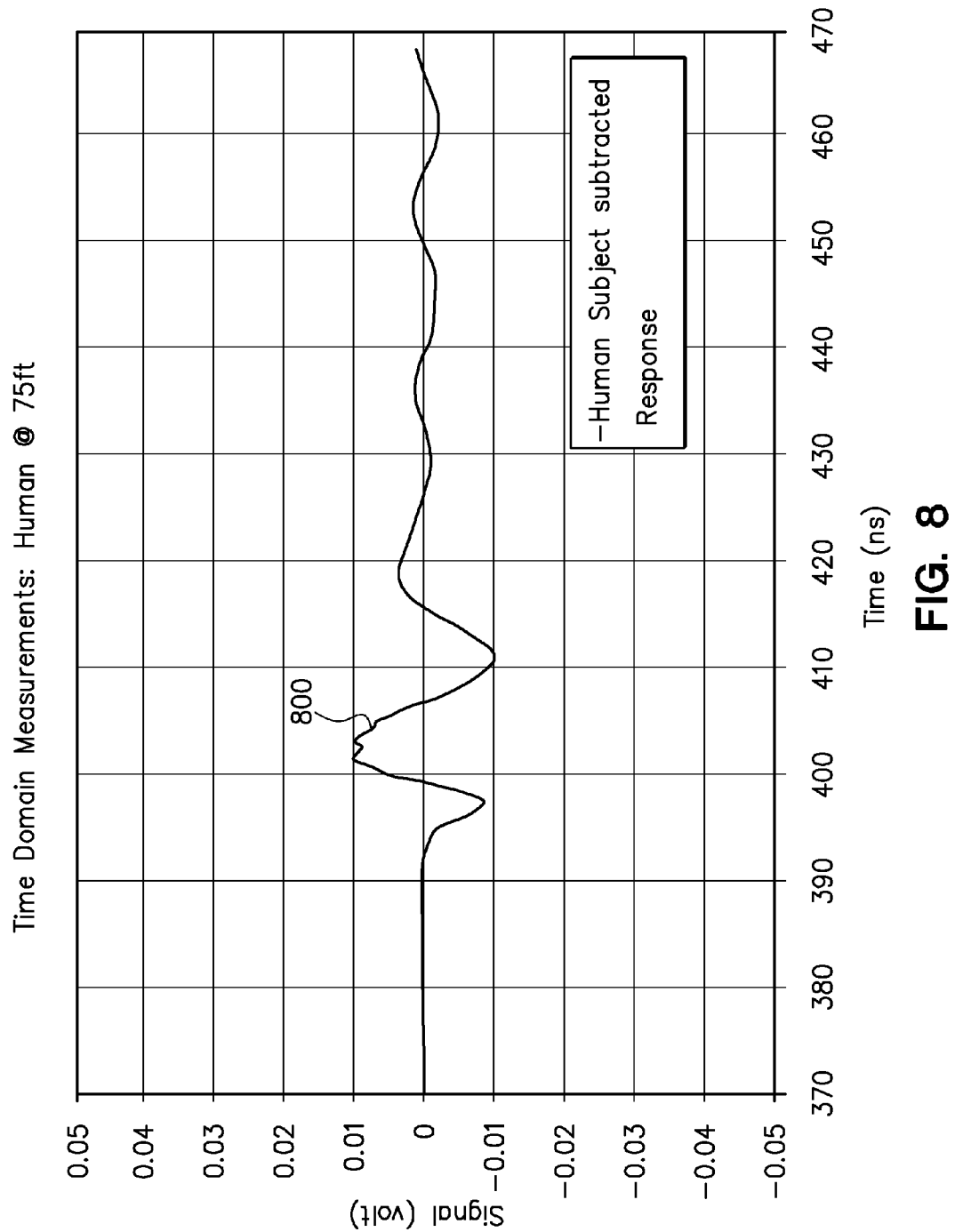
Figure 9:
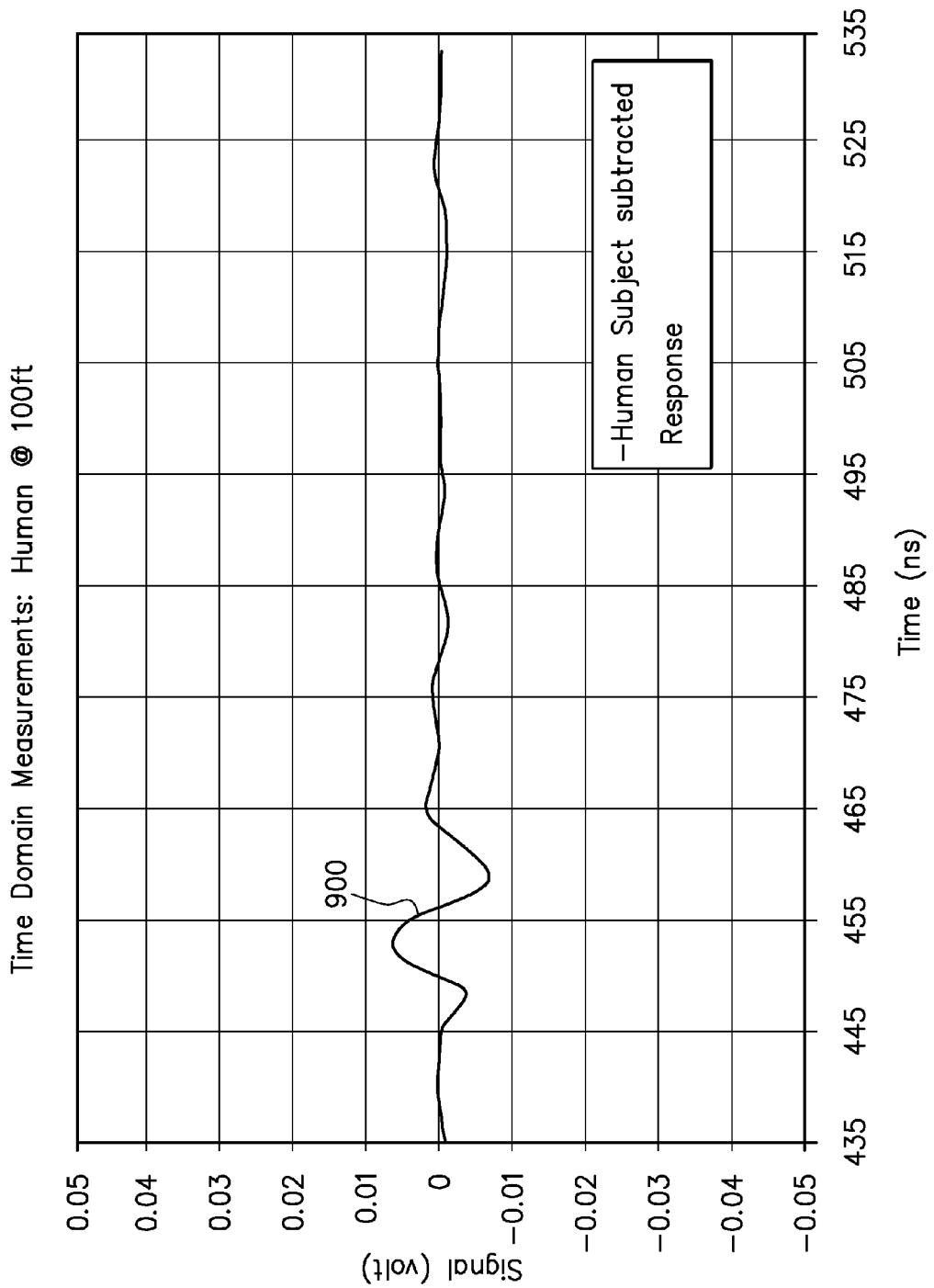

FIGS. 7-9 are reference time domain responses of humans 170, which can result from performing the methods of the present invention according to several embodiments. Response curve 700 is a reference human response at 55 feet, response curve 800 is a reference human response at 75 feet and response curve 900 is a reference human time domain response for a human at 100 feet. It can be inferred from FIGS. 7-9 that to increase the range of the systems and methods of several embodiments, a directional antenna 160 could be used. Alternatively, a high power electromagnetic signal 164 can be generated by impulse generator 110 and directional coupler 120.

In some cases, it may be advantageous to display the response energy 174, as a frequency response. In these cases and FFT of the time domain responses can be accomplished to the stored reference signal of box 410 to generate a stored human frequency response. An FFT can be accomplished on the results of Step 414 and compared to the stored human frequency response according to several embodiments, to determine whether (or not) a human 170 is located within the AOI.

In various embodiments where the above-described systems and/or methods are implemented by processing device 140 using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a processing device 140, which can be a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods implement the individual systems and/or methods and coordinate the functions of the individual systems and/or methods related to communications.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for remotely detecting a human within an area of interest (AOI), comprising the steps of:
   A) conducting a first time domain measurement of response signal energy from said AOI when said human is not present in said AOI to establish a background signal;
   B) conducting a second time domain measurement of response signal energy from said AOI when at least one said human is present in said AOI, to establish a background-plus-human signal, said background-plus-human signal being due to mutual impedance phenomena between said human and said AOI;
   C) subtracting the results of said step A) from said step B) to yield a reference human signal;
   D) storing said reference human signal
   E) selectively conducting at least one third time domain measurements of response energy from said area; and,
   F) subtracting the results of said step A) from said step E); and,
   G) comparing the results of said step E) to said reference human signal from said step D).

2. The method of claim 1, comprising the following steps of:
   H) conducting a Fast Fourier Transform (FFT) on said reference human signal to yield a reference human frequency response;
   I) conducting an FFT on the results of said step F);
   J) comparing the results of said step H) to said step I); and, said steps H), I) and J) being accomplished in lieu of said step G).

3. The method of claim 1, further comprising the step K) of periodically transmitting an electromagnetic signal, said step K) occurring at least once before said step A).

4. The method of claim 3, wherein said step K) is accomplished in the frequency range between 0-200 MHz.

5. The method of claim 1, further comprising the step L) of alerting a user when said step G) indicates that a human is present in said area.

6. A system for remotely detecting the presence of a human within an area of interest (AOI), comprising:
   an antenna;
   a signal generator coupled to the antenna, said signal generator being operable to cause the antenna to periodically emit electromagnetic signals towards said AOI;
   a data capture device operable to capture response signal energy received by the antenna, said response signal energy being provided from said AOI in response to the first electromagnetic signal; and
   a processor connected to said data capture device, said processor including a non-transitory computer readable medium containing computer instructions stored therein for causing said processor to perform the step of analyzing said response signal energy to determine whether or not said human is present in said AOI;
   wherein said processor accomplishes said analysis by taking steps comprising;
      A) conducting a first time domain measurement of response signal energy from said area when said human is not present in said AOI, to establish a background signal;
      B) conducting a second time domain measurement of response signal energy from said AOI when at least one said human is present, to establish a background-plus-human signal, said background-plus-human signal being due to mutual impedance phenomena between said human and said AOI;
      C) subtracting the results of said step A) from said step B) to yield a reference human signal; selectively repeating said steps A) through said C);
      D) storing said reference human signal
      E) selectively conducting at least one third time domain measurements of response energy from said area;
      F) subtracting the results of said step A) from said step E); and,
      G) comparing the results of said step E) to said reference human signal.

7. The system of claim 6, wherein said processor further accomplishes the steps of:

H) conducting a Fast Fourier Transform (FFT) on said reference human signal to yield a reference human frequency response;

I) conducting an FFT on the response energy resulting from said step F);

J) comparing the results of said step H) to said step I); and, said steps H), I) and J) being accomplished in lieu of said step G).

* * * * *